US 12,338,914 B2

(12) United States Patent
Vincon et al.

(10) Patent No.: US 12,338,914 B2
(45) Date of Patent: Jun. 24, 2025

(54) ROTARY SLIDE VALVE FOR REGULATING A FLOW OF FLUID, AND METHOD FOR PRODUCING A ROTARY SLIDE VALVE

(71) Applicant: ETO MAGNETIC GMBH, Stockach (DE)

(72) Inventors: Peter Vincon, Stockach (DE); Michael Feindler, Stockach (DE); Yannick Goos, Constance (DE)

(73) Assignee: ETO MAGNETIC GMBH, Stockach (DE)

(*) Notice: Subject to any disclaimer, the term of this patent is extended or adjusted under 35 U.S.C. 154(b) by 44 days.

(21) Appl. No.: 17/765,569

(22) PCT Filed: Oct. 1, 2020

(86) PCT No.: PCT/EP2020/077444
§ 371 (c)(1),
(2) Date: Mar. 31, 2022

(87) PCT Pub. No.: WO2021/064065
PCT Pub. Date: Apr. 8, 2021

(65) Prior Publication Data
US 2022/0364650 A1 Nov. 17, 2022

(30) Foreign Application Priority Data
Oct. 4, 2019 (DE) ..................... 10 2019 126 775.7

(51) Int. Cl.
*F16K 5/04* (2006.01)
*F16K 27/06* (2006.01)
*B24B 15/04* (2006.01)

(52) U.S. Cl.
CPC ............ *F16K 5/045* (2013.01); *F16K 27/065* (2013.01); *B24B 15/04* (2013.01); *Y10T 137/0486* (2015.04); *Y10T 137/428* (2015.04)

(58) Field of Classification Search
CPC . F16K 5/045; F16K 27/065; B24B 15/00–04; Y10T 29/49416–49419;
(Continued)

(56) References Cited

U.S. PATENT DOCUMENTS 270,527 A * 1/1883 Westinghouse, Jr. ... B24B 15/08
451/116
521,980 A * 6/1894 Jarvis ...................... B24B 15/08
451/116
(Continued)

FOREIGN PATENT DOCUMENTS

CN   101539213 A   9/2009
CN   110043692 A   7/2019
(Continued)

OTHER PUBLICATIONS

International Search Report and Written Opinion dated Dec. 15, 2020 for corresponding application PCT/EP2020/077444.
(Continued)

*Primary Examiner* — Craig J Price
(74) *Attorney, Agent, or Firm* — Bachman & LaPointe, P.C.

(57) ABSTRACT

A method for producing a rotary slide valve for regulating a flow of fluid, including a rotary slide (02) which is rotatably mounted about a rotational axis (R) in a valve housing, includes producing the rotary slide (02) by injection molding, producing at least one circumferential or casing section (04) of the valve housing (03) by injection molding, and installing the rotary slide (02) within the valve housing (03). A gap between the rotary slide (02) and the directly adjacent valve housing circumferential or casing section (04) of the valve housing (03) in the radial direction, allows the rotary slide (02) to rotate about the rotational axis (R) and facilitates a seal which does not exceed a tolerable leak between
(Continued)

the rotary slide (02) and the circumferential or casing section (04) of the valve housing (03).

7 Claims, 2 Drawing Sheets

(58) Field of Classification Search
CPC ........... Y10T 137/0486; Y10T 137/428; Y10T 29/511; Y10T 82/29
USPC ....... 137/315.01–329.4, 15.08, 15.17, 15.11; 29/890.121, 890.128, 890.132, 402.06, 29/890.126, 557; 451/430, 116, 117, 118, 451/115; 264/162
See application file for complete search history.

(56) References Cited

U.S. PATENT DOCUMENTS

| | | | | |
|---|---|---|---|---|
| 1,256,185 | A * | 2/1918 | Tripp | B24B 15/04 451/379 |
| 3,012,752 | A * | 12/1961 | Buck | F16K 5/0414 D24/129 |
| 3,048,192 | A * | 8/1962 | Murphy, Jr. | F16K 27/065 251/312 |
| 3,185,179 | A * | 5/1965 | Harautuneian | A61M 39/223 251/181 |
| 3,206,837 | A * | 9/1965 | Holmes | B23Q 35/02 29/890.128 |
| 3,788,599 | A * | 1/1974 | Cloyd | F16K 5/025 251/181 |
| 4,073,314 | A * | 2/1978 | Speelman | F16K 11/0853 251/367 |
| 4,147,184 | A * | 4/1979 | Jess | F16K 5/0292 251/312 |
| 4,277,046 | A * | 7/1981 | Cavileer | F16K 5/025 251/312 |
| 4,525,910 | A * | 7/1985 | Boehmer | B29C 69/001 29/890.128 |
| 4,564,171 | A * | 1/1986 | Heinzerling | A61M 5/16877 251/309 |
| 5,048,235 | A * | 9/1991 | Smith | B24B 1/00 125/11.01 |
| 8,474,140 | B2 * | 7/2013 | Erbes | B24B 5/04 29/890.128 |
| 8,695,624 | B2 * | 4/2014 | Hopf | A61M 39/223 604/32 |
| 11,541,223 | B2 * | 1/2023 | Hopf | F16K 11/085 |
| 2005/0035324 | A1 * | 2/2005 | McPeak | F16K 27/06 251/368 |
| 2009/0173903 | A1 * | 7/2009 | Kaneko | F16K 27/06 251/368 |
| 2012/0103448 | A1 | 5/2012 | Hopf et al. | |
| 2019/0099594 | A1 * | 4/2019 | Liu | A61M 39/22 |

FOREIGN PATENT DOCUMENTS

| | | |
|---|---|---|
| DE | 939377 B | 6/1956 |
| DE | 1008979 A | 5/1957 |
| DE | 2150635 A1 | 4/1973 |
| DE | 3444532 A1 | 6/1986 |
| DE | 102012211116 A1 | 1/2014 |
| EP | 0113915 B1 | 10/1988 |
| EP | 0575643 B1 | 10/1995 |
| EP | 2103852 A2 | 9/2009 |
| WO | 2008142071 A1 | 11/2008 |
| WO | 2019065601 A1 | 4/2019 |

OTHER PUBLICATIONS

Office Action dated Jan. 1, 2024 for corresponding application CN202080078577.8.
Office Action dated May 22, 2024 for corresponding application CN202080078577.8.
Office Action dated Jul. 13, 2024 for corresponding application CN202080078577.8.

* cited by examiner

ROTARY SLIDE VALVE FOR REGULATING A FLOW OF FLUID, AND METHOD FOR PRODUCING A ROTARY SLIDE VALVE

BACKGROUND OF THE INVENTION

The present invention relates to a method for producing a rotary slide valve as disclosed herein. Furthermore, the present invention relates to a rotary slide valve having the features disclosed herein.

Generic rotary slide valves and methods for their production are known from various fields of fluid technology. For example, but by no means exclusively, said generic rotary slide valves can be used in vehicles for controlling fluid flows of different operating fluids or operating media. For example, the known rotary slide valves can be used in low-pressure circuits, i.e., in circuits with preferably prevailing working pressures of less than 20 bar. As an example, a cooling liquid or cooling water can be controlled and/or mixed using such a rotary slide valve in order to, for example, control the temperature of charge air in the course of a charge air temperature control by means of a cooling fluid or cooling water in a secondary circuit of the cooling fluid or the cooling water circuit of a combustion engine.

In the case of the rotary slide valves known from the state of the art, the rotary slide, which is mounted in a valve housing in such a manner that it can rotate about an axis of rotation and which is also referred to as a plug depending on the application or the use of the rotary slide valve, is typically sealed against the valve housing having the respective inlet and/or outlet openings of the fluid or the fluids by providing sealing means or sealing bodies in order to ensure or guarantee a tightness of the rotary slide valve. Seals made of elastomers may be used as sealing means, said seals being disposed and used between the rotary slide and the valve housing in each case, in particular in the area of the fluid inlets and the fluid outlets and the associated openings in the valve housing.

Even though the use of the known sealing means of the rotary slide valves according to the state of the art achieves sufficient tightness, the use of the known sealing means is still disadvantageous for various reasons After all, said sealing means have to be produced and installed or at least co-installed in the course of the assembly of the rotary slide valve. This makes the assembly more complex and more expensive.

At the same time, the sealing elements, the sealing bodies or the sealing means are subject to different wear and fatigue factors by nature, which means that the tightness of the rotary slide valve essentially or materially depends on the lifetime or the erosion and/or the wear of the sealing means.

SUMMARY OF THE INVENTION

Based on this state of the art, the object of the present invention is to provide a production method for producing a rotary slide valve and to propose a corresponding rotary slide valve which enables a simpler and therefore less expensive production, in particular including a reduction of the parts required for production, while leading to a rotary slide valve in which components which are particularly durable or insusceptible to wear and fatigue determine the functionality, in particular the tightness, on the whole.

This object is attained by a method for producing a rotary slide valve having the features disclosed herein. Advantageous embodiments of the invention are also disclosed herein and/or are the subject matter of the dependent claims.

This means that in addition to the generally known production of the rotary slide in an injection molding process, in particular in a plastic injection molding process, or a metal casting process or a metal sintering process and the production of at least a circumferential or barrel portion of a valve housing, preferably with the appropriate inlet and outlet openings, also in an injection molding process, particularly preferably in a plastic injection molding process, or a metal casting process or a metal sintering process, the method according to the invention provides according to the invention that when assembling the rotary slide valve or a precursor thereof, a gap is formed in the radial direction between the rotary slide and the immediately adjacent circumferential or barrel portion of the valve housing, the gap allowing the rotary slide to rotate about the axis of rotation and enabling a sealing which does not exceed a tolerable leakage between the rotary slide and the circumferential or barrel portion of the valve housing.

In other words this means that, according to the invention, the manufacturing precision of the rotary slide and/or the circumferential or barrel portion of the valve housing forms the basis for said components and their respective surfaces to be adapted to one another with such precision that only a minimal gap forms or remains between the components in the assembled state, said gap allowing the rotary slide to rotate about the axis of rotation while still enabling a sufficient sealing or sealing effect between the valve housing and the rotary slide, in particular between the rotary slide and the circumferential or barrel portion of the valve housing.

Thus, the present invention is also based on the surprising finding that there definitely are fields of application or individual applications for rotary slide valves, such as the fields of application in the field of low-pressure cooling fluid circuits and secondary cooling fluid circuits of combustion engines, in which a low degree or a minimum degree of leakage, which results from the inevitably remaining gap between the rotary slide and the valve housing according to the present invention, for example, is acceptable or negligible for the functionality to be controlled by the valve, while it is possible, however, for the enormous advantage to be achieved that respective sealing means or sealing measures of the fluid inlet openings or the fluid outlet openings in the valve housing, for example, in particular against the rotary valve slide, can be dispensed with.

In other words, this means that the present invention makes it possible for additional sealing means or sealing elements made of elastomer material, for example, can be largely dispensed with or, at least in the interior of the valve housing, entirely dispensed with since the precision fit of the rotary slide in relation to the valve housing can be set with such precision by the production and assembly according to the invention and such a small gap between the rotary slide and the valve housing can be achieved that the leakage to be tolerated or accepted in order to maintain the rotatability of the rotary slide is small enough for it to not have any adverse effect on the functionality of the rotary slide valve.

For linguistic simplification, the circumferential or barrel portion of the valve housing shall be referred to as the barrel portion throughout the following description.

It can be provided for both the barrel portion and the rotary slide to be made of metal. If not the exact same materials are used for the two components, it must be ensured that the thermal expansion behavior exhibited by the materials used is as similar as possible or identical. The same also applies to a production from plastic if different plastics are used. However, particular attention has to be payed to the thermal expansion behavior if hybrid systems are to be produced in which the rotary slide is to be made of metal and the barrel portion is to be made of plastic, for example. Aluminum and polyphenylene sulfide plastic (PPS plastic) can be used as a combination in which the expansion behaviors tend to be similar, for example.

According to a preferred embodiment, the rotary slide and/or the circumferential or barrel portion of the valve housing can be reworked to obtain defined outer and/or inner diameters in relation to the axis of rotation and the rotary slide can be immediately adjacent to the circumferential or barrel portion of the valve housing in the radial direction in the assembled state. The need for reworking can strongly depend on the tolerances to be observed and the methods and materials used. Materials and methods such as metal casting processes can sometimes achieve a precision which makes reworking unnecessary. In the case of plastic injection molding, on the other hand, reworking can be sensible depending on the material in order to achieve the precisions needed to ensure that the maximum admissible leakage between the rotary slide and the housing or the barrel portion is not exceeded without additional seals or sealing means.

If the components can be produced without reworking, they typically have an amorphous surface structure. In the case of reworking, characteristic surface features resulting from or caused by the reworking occur on the respective surfaces. For example, a grinding process leaves microgrooves on a surface of the rotary slide or the barrel portion. Consequently, a rotary slide or a barrel portion reworked in this manner presents microgrooves or grinding groves.

The rotary slide and the barrel portion can basically have different geometrical inner and outer surfaces, which are then subjected to the respective reworking. In this context, geometries having a constant diameter are typically known, which then result in a rotary slide having an essentially cylindrical cross section or a cylindrical radial outer surface and also in barrel portions having a continuous or constant inner diameter or a cylindrically shaped inner surface. However, rotary slide valves for which a non-constant contour of the inner surfaces and the outer surfaces in the axial direction of the axis of rotation is intended are also known. For example, rotary slide valves are known whose rotary slide has an essentially spherical outer contour or outer surface and whose valve housing consequently also has a spherical inner surface. In the case of geometries of this kind, too, the present invention can be applied even though geometries having a continuous diameter or a continuous radius along the axis of rotation can be reworked in a simpler and more effective manner. In this regard, the component of the valve housing in the form of a barrel portion is to be mentioned again, which then forms a part of the valve housing which corresponds to a cylinder barrel or a part of a cylinder barrel or forms a cylinder barrel at least on its inner surface.

According to an advantageous embodiment of the method according to the invention, the rotary slide and/or the barrel portion of the valve housing can be produced, in particular injection-molded, as glass-fiber-reinforced plastics, preferably with a glass fiber content of 30% to 50%, the content of the glass fiber material or the content of the glass fibers relating to the weight of the rotary slide or the barrel portion of the valve housing. The production as glass-fiber-reinforced plastics or glass-fiber-reinforced plastic components leads to a mechanical stability which is particularly advantageous for the present invention and to a shape and a geometry of the components, in particular of the rotary slide and/or the barrel portion, which is independent or at least largely independent from environmental factors and environmental conditions, which means that the rotary slide valve according to the invention can be used for a long time under variable environmental conditions without wear or changes caused by environmental conditions, in particular an expansion and/or a contraction of the components, negatively affecting the functionality, in particular the tightness, preferably because of the expansion of the gap between the rotary slide and the barrel portion.

Advantageously, the rotary slide and/or the barrel portion can also be produced using a polyphenylene sulfide plastic. Producing said components from or at least based on polyphenylene sulfide plastics also enables the production of durable shapes and geometries of said components which are simultaneously largely independent from environmental conditions, in particular temperature conditions. A use of polyphenylene sulfide plastic in combination with glass fibers or with an embedding of glass fibers in the course of the injection molding process can be provided in a particularly advantageous manner.

Also, the reworking of the rotary slide can particularly advantageously comprise a grinding process, preferably a through-feed grinding process, for adjusting the outer diameter, in particular for adjusting the radial outer diameter, or more generally for adjusting the outer surface of the rotary slide. In this case, the rotary slide has microgrooves or grinding grooves on the reworked surfaces, which, however, do not negatively affect the functionality and the tightness of the rotary slide valve.

Appropriate grinding processes or through-feed grinding processes can be advantageously used to influence or machine the outer contour or the outer surface, preferably a radial outer diameter, of the rotary slide while simultaneously allowing hard to very hard materials, such as glass-fiber-reinforced PPS plastics, to be machined.

Advantageously, the method according to the invention can further provide that the grinding process is carried out in such a cascaded manner that multiple rotary slides are partially plugged into one another in an axial direction and form a rotary slide group, the radial surface of the rotary slide group being essentially formed by the surface to be machined or ground. This enables a particularly effective grinding process, which additionally yields continuously good machining or grinding results across a plurality of rotary slides to a very high degree. In this regard, it can be provided for the rotary slides to have complementary or partially complementary projections or protrusions and associated or mating recesses in the axial direction, which allow the rotary slides to be partially plugged into one another while preferably enabling a rotation lock or a protection against twisting of the rotary slide group and thus facilitating the grinding of the rotary slide group.

Since glass-fiber-reinforced plastics in particular, such as glass-fiber-reinforced PPS plastics, make high demands on the wear of abrasives, the grinding process is carried out using an abrasive based on silicon carbide according to an also exemplary or preferred embodiment of the method according to the invention. This ensures that the materials which can be used in producing the rotary slide and which may be demanding in terms of machining or reworking or difficult to machine can also be machined effectively and with the required precision.

With regard to the reworking of the barrel portion of the valve housing, it can be advantageous for a reaming process and/or a honing process to be used for adjusting the inner diameter, preferably for adjusting the radial inner diameter, or, more generally speaking, for adjusting the inner surface.

Particularly preferably, either a reaming process or a honing process is used since this can advantageously further reduce the total number of production steps or machining steps of the method according to the invention. However, it can also be provided for both a reaming process and a honing process to be used to rework the barrel portion of the valve housing. The advantageously provided machining methods for adjusting the inner diameter or the inner surface of the barrel portion can also ensure that the advantageously provided hard materials of the barrel portion which are difficult to machine are machined safely, reliably and with the necessary precision. The particular suitability of reaming processes and/or honing processes essentially results from the fact that an inner surface or an inner diameter of a component is reworked.

When a honing process is used, the machined surface, such as the inner surface of the barrel portion, presents a cross pattern. The latter is produced when the rotation or the translation (up-and-down movement) overlaps during honing and is visible on the surface under appropriate magnification.

Another advantageous aspect of the method lies in the fact that the reaming process can be carried out using a tool having a hard metal cutting edge, in particular a CVS-coated or CVD-coated cutting edge. This also takes into account that the materials preferably used, such as metal or glass-fiber-reinforced plastics, make high demands on the respective machining tool in terms of wear, in particular in terms of wear of the cutting edge. With CVD-coated cutting edges, however, it is definitely possible to machine the advantageously used glass-fiber-reinforced plastics over a longer period of time and in particular achieve the required precision in the process.

According to another particularly preferred variation of the method, the reworking of the rotary slide and/or of the barrel portion can additionally comprise a deburring process carried out after the adjustment of the respective inner or outer diameter. This can entail deburring the barrel portion of the valve housing in the area of cross bores or in the area of transitions to the fluid inlet openings or the fluid outlet openings. Also, the barrel portion of the valve housing can be deburred at axial ends, in particular in the area of the reaming entry. Deburring in the area of the reaming exit can be provided as well.

Particularly preferably, the deburring process can be carried out as a blast deburring process or as an edge milling process. In a blast deburring process, plastic granulates can be used, for example, which are directed at the respective surfaces in the form of a jet by appropriate acceleration, where they effect the deburring. Depending on the material to be machined, however, other blasting materials can be used, such as ceramics, metal or glass. However, deburring by means of an edge mill or deburring using a deburring tool having a defined cutting edge on a suitable machine can be provided as well. With regard to the deburring of the rotary slide, it can be advantageously provided for said deburring to take place by means of blast deburring, in which case appropriately suitable plastic granulate, which is directed at the component or at multiple components in the form of a jet, can also be advantageously used.

This reworking, too, leaves characteristic features on the surfaces.

According to an also advantageous aspect of the method, housing lids and/or housing bottoms completing or closing the valve housing in the axial direction can additionally be produced, the housing lids and/or the housing bottoms preferably being made of the same material as the barrel portion of the valve housing. This achieves different advantages. For example, this achieves a uniform, in particular a uniformly low, expansion or shrinking behavior, in particular under thermal stress or at different temperatures, which prevents stresses in the valve. At the same time, a housing lid and/or a housing bottom, which is preferably made of the same material as the barrel portion, enables an advantageous connection of the respective elements or components of the valve housing.

In this context, the barrel portion and the housing lid and/or the housing bottom can advantageously also be connected, preferably welded, particularly preferably ultrasonically welded, to each other, an ultrasonically welded connection only being an option for plastic components, whereas welding is also possible and advantageous for metal components. This achieves a secure and equally reliable connection of the components of the valve housing.

With regard to a rotary slide valve for controlling a fluid flow, the rotary slide valve comprising a rotary slide mounted in a valve housing in such a manner that it can rotate about an axis of rotation, and the rotary slide and at least a circumferential or barrel portion of the valve housing being produced as injection-molded components, in particular as injection-molded plastic components, the object mentioned above is attained by the fact that a gap is formed in the radial direction between the rotary slide and the immediately adjacent circumferential or barrel portion of the valve housing, the gap allowing the rotary slide to rotate about the axis of rotation and enabling a sealing which does not exceed a tolerable leakage between the rotary slide and the barrel portion of the valve housing.

In other words, this means that, with regard to the rotary slide valve, the object of the present invention is attained by the fact that the outer surface or a part of the outer surface of the rotary slide is disposed immediately adjacent to an inner surface or a part of the inner surface of the valve housing, in particular in the area of a barrel portion of the valve housing, in the assembled state or at least in a partially assembled state of the rotary slide valve without sealing means or sealing elements being disposed between the rotary slide and the valve housing in the area of cross bores or inlet openings or outlet openings for the fluid to be controlled, for example.

Preferably, the gap can have a gap width which is between a few micrometers and a few hundred micrometers, preferably about 350 µm. The essential aspects in dimensioning the gap width are the leakage which is not to be exceeded, the nominal diameter of the valve, the functionality (mixing/switching/controlling) fulfilled by the valve and the number of fluid inlet and fluid outlet openings. Such a gap width can be obtained with a still appropriate amount of machining of the valve components while ensuring a minimum degree of tightness. In other words, such a gap or such a gap width ensures that a tolerable or reasonable leakage or leakage rate is not exceeded. The reasonable or tolerable leakage or leakage rate can vary depending on the application. In the individual applications of rotary slide valves mentioned above as examples, such as the use as a mixing valve, preferably in a low-pressure circuit of a coolant or cooling fluid circuit, a leakage of less than 0.1 l/min at a working pressure of about 1.5 to 2 bar and a position of the rotary slide valve in one of the end positions can still be considered acceptable, for example.

Depending on the number and the position of the fluid inlet openings and the fluid outlet openings and depending on the functionality of the rotary slide valve, the leakage gap lengths formed by the gap can vary while the remaining dimensions stay the same, which means that the leakage or the leakage rate is affected as a function of the number of fluid inlet openings and fluid outlet openings and as a function of on the functionality, such as a switching functionality, a mixing functionality and the like. So it may be necessary for the gap width or the requirements regarding the gap width in relation to the valve, in particular in relation to the nominal diameter of the rotary slide valve, to be adapted to the respective design of the rotary slide valve in order to adhere to the admissible or tolerable leakage limit without having to resort to using sealing means, such as elastomer seals.

Regarding the effects and advantages of the rotary slide valve, reference is also made to the preceding explanations regarding the method for its production to avoid unnecessary repetitions. In other words, this means that features, effects and advantages disclosed in connection with the method are to be considered as also relating to the device and, if indicated, vice-versa.

As an alternative to being injection molded parts or injection-molded plastic parts, the rotary slide and the barrel portion can also be metal components, preferably cast metal components or sintered metal components. The metal components have a mechanical stability which can only be achieved using special plastics or plastic composite materials in the case of plastic components.

According to an advantageous embodiment of the rotary slide valve, the rotary slide and/or the barrel portion of the valve housing can also be glass-fiber-reinforced plastic components, in particular with a glass fiber content of 30 w % to 50 w %.

So the configuration of the rotary slide and/or of the barrel portion as in particular glass-fiber-reinforced plastic components enables, inter alia, an operation of the rotary slide valve in a broad temperature spectrum without this noticeably changing the gap dimensions, in particular the gap width, and thus the leakage or the leakage rate.

Advantageously, the rotary slide and/or the barrel portion can also be preferably glass-fiber-reinforced plastic components based on polyphenylene sulfide plastic.

Furthermore, the rotary slide can advantageously have a ground, preferably radial outer surface. The ground surface or outer surface preferably presents grinding grooves or microgrooves. The grinding can advantageously be carried out in a cascaded manner using different abrasives, such as abrasives of different grain sizes, so as to achieve an ideal grinding result. For example, the grinding can be carried out long enough or with increasing precision until the diameter tolerance of the rotary slide is between 1 µm and 100 µm. The determining factors indicated with regard to the gap width are also critical in this context and are to taken into account accordingly.

Additionally, the barrel portion can advantageously have a preferably radial inner surface produced in a reaming process and/or a honing process.

In the case of a honing process, the latter produces a cross pattern on the surface to be machined, which means that the inner surface of the barrel portion presents a cross pattern, for example.

So a reaming process may be combined with a honing process in order to obtain the reworked inner surface of the barrel portion of the valve housing, in which case the reaming process is preferably carried out before carrying out the honing process. However, an exclusively reamed or an exclusively honed inner surface can be present as well. Pre-drilling can also be carried out in addition to the reaming process and/or the honing process, the pre-drilling being preferably followed by both a reaming process and a honing process. Even though the latter variation provides the most extensive process, it leads to the lowest tolerance of the inner surface.

Overall, the inner surface of the barrel portion can advantageously be realized with a diameter tolerance of 1 µm to 100 µm. The determining factors indicated with regard to the gap width are also critical in this context and are to be taken into account accordingly.

According to another advantageous embodiment of the rotary slide valve, the barrel portion and/or the rotary slide can have a deburred inner surface or outer surface. Advantageously, the deburring is carried out in addition to the other reworking processes for adjusting or realizing the desired inner diameters or outer diameters.

Furthermore, the components, in particular the rotary slide and/or the barrel portion of the valve housing, can advantageously be washed prior to assembly and after reworking in order to remove chips and other particles prior to assembly.

According to an equally advantageous embodiment of the rotary slide valve, the valve housing can have housing lids and/or housing bottoms which complete and/or close the valve housing in the axial direction and which are preferably made of the same material as the barrel portion of the valve housing.

Advantageously, the barrel portion, the housing lid and/or the housing bottom can also be connected, preferably, welded, particularly preferably ultrasonically welded, to one another. An ultrasonically welded connection is sensible for plastic components only, whereas welding is also possible and advantageous for metal components.

BRIEF DESCRIPTION OF THE DRAWINGS

Details of the method according to the invention and the rotary slide valves according to the invention will be discussed below with reference to merely schematic drawings of configuration examples.

DETAILED DESCRIPTION

Figure 1:
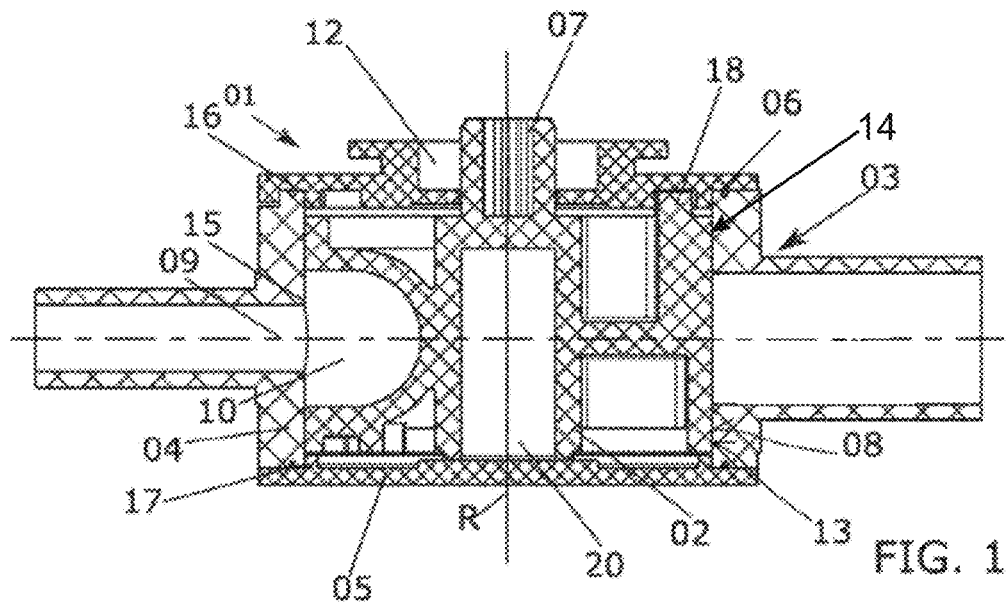
FIG. 1: is a sectional drawing through a rotary slide valve according to the invention in a first embodiment.

FIG. 1 shows a section through a rotary slide valve 01 according to the invention, rotary slide valve 01 having an essentially cylindrical rotary slide 02 and a valve housing 03, which is adapted to the shape or the geometry of rotary slide 02.

Rotary slide 02 can be made of glass-fiber-reinforced plastic or alternatively of metal. Valve housing 03 comprises a circumferential or barrel portion 04, which shall be merely referred to as barrel portion 04 hereinafter. The barrel portion can also be made of glass-fiber-reinforced plastic or alternatively of metal. Furthermore, valve housing 03 comprises a housing bottom 05 and a housing lid 06. In the assembled state of FIG. 1, housing bottom 05, housing lid 06 and barrel portion 04 are connected, in particular welded, to one another by connections, such as ultrasonic welds, which are not illustrated in FIG. 1. The ultrasonic welds are produced when plastic components are ultrasonically welded. When metallic materials and components are used, conventional welding methods for connecting metals can be employed. Rotary slide 02 has a drive journal 07, which can be formed in one piece or in multiple pieces with rotary slide 02 and which is connected to rotary slide 02 through an opening in housing lid 06 in order to transmit an adjusting force of an external drive to rotary slide 02 via drive journal 07.

On its essentially cylindrical outer surface 08, rotary slide 02 has one or multiple channels or recesses 10, which, depending on the rotational position of rotary slide 02 about axis of rotation R, enable the switching function or the mixing function or another function of rotary slide valve 01 by establishing, interrupting or regulating a fluid flow between fluid openings 09, which are formed in barrel portion 04. For example, recesses 10, which are formed on outer surface 08 of rotary slide 02, can have a variable width or height and thus influence the passage quantity or the passage volume of the fluid to be controlled depending on the rotational position rotary slide 02.

Outside of valve housing 03, a sealing element or a seal can be provided in order to preferably seal rotary slide 02, in particular drive journal 07, in the axial direction or in relation to the respective opening of housing lid 06. Said seal or sealing means are provided with reference sign 12 in FIG. 1.

In the interior of valve housing 03, no sealing means or no seal is disposed in particular between radial outer surface 08 of rotary slide 02 and radial inner surface 13 of barrel portion 04, in particular in the area of fluid openings 09. Instead, the method according to the invention allows the components to be disposed in such a manner according to the invention as illustrated in FIG. 1 that a very narrow gap 14 is formed between barrel portion 04 and rotary slide 02, gap 14 being selected to be small enough for the rotation of the rotary slide to be possible while a tightness of the rotary slide valve which does not exceed an admissible or tolerable leakage or leakage rate is obtained. For this purpose, both rotary slide 02 and barrel portion 04 can be made of glass-fiber-reinforced plastic components which are injection-molded first and are reworked in such a manner in particular at outer surface 08 and inner surface 13 using appropriate reworking processes following the injection molding process that the gap width of gap 14 is minimized far enough for the leakage or the leakage rate to no exceed the reasonable or tolerable limits. Alternatively, reworking can also be omitted depending on the precision of the production process of the components.

With regard to barrel portion 04, three different method variations of the reworking are possible, for example; this is not supposed to constitute a list or enumeration limiting the invention but rather merely comprises advantageous variations. In general, reworking takes place after the injection molding, in which the inner diameter or the diameter of inner surface 13 is produced or injection-molded with an allowance, which ensures that the inner diameter produced is generally slightly too small within the scope of the tolerances due to the production technique and that the subtractive reworking thus leads to a slightly enlarged intended inner diameter. In a first example, the injection molding with allowance is followed by a pre-drilling of the inner surface, followed by a reaming and a subsequent honing of the inner surface; the machining or the machining steps for adjusting the inner diameter of the inner surface 13 may be additionally followed by a deburring process, which may be carried out either by blast deburring using a plastic granulate or by a deburring process using an edge mill and in which edges 15 of fluid openings 09 of barrel portion 04, which are cross-bores, and the axial ends of barrel portion 04, which form reaming entry 16 and reaming exit 17 of barrel portion 04, for example, are preferably deburred. A second alternative approach could, for example, involve merely carrying out a reaming after the injection, which is preferably carried out using a reaming tool having a defined and possibly CVS-coated or CVD-coated hard metal cutting edge, before finally carrying out a deburring on an appropriate machine, preferably using a deburring tool which also has a defined cutting edge. In a third example of the method, the injection of barrel portion 04 is followed exclusively by honing or a honing process for adjusting the diameter of inner surface 13, followed by blast deburring using plastic granulate, in which case, too, edges 15 of fluid openings 09 and axial ends 16 and 17 of the barrel portion are preferably deburred or at least co-deburred.

With the reworking methods mentioned above, inner surface 13 can be obtained with a tolerance with regard to the diameter which leads or at least contributes to a consequently low leakage rate.

The reworking of rotary slide 02, in particular of outer surface 08 of rotary slide 02, equally contributes to the low leakage rate and/or to a dimensioning of gap 14 which is as small as possible. It can preferably be carried out by centerless grinding in a through-feed grinding process, which may be followed by a deburring process, particularly preferably in the course of a blast deburring process using a suitable plastic granulate. Reference is made to the following illustrations of FIGS. 2 and 3 with regard to the execution of the grinding process.

Figure 2:
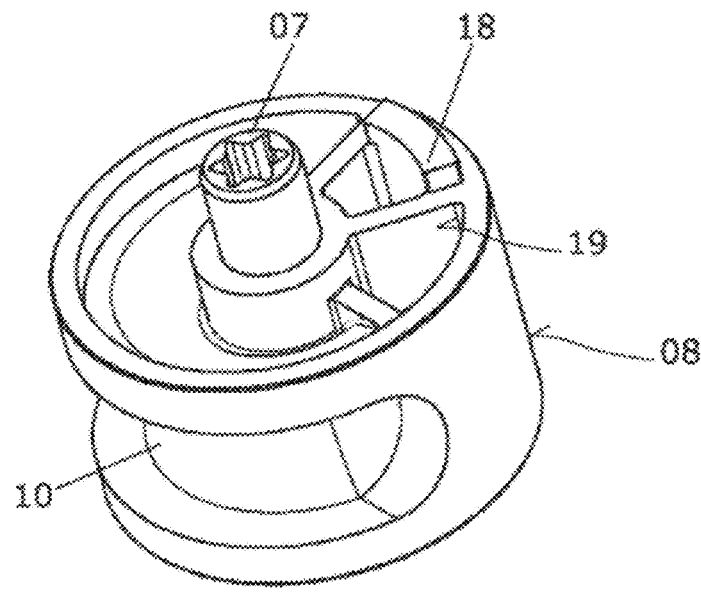
FIG. 2: is a perspective illustration of a rotary slide for use in the method according to the invention and the rotary slide valve according to the invention.

FIG. 2 shows a perspective illustration of a rotary slide 02 for use in the production method according to the invention and in the application as a rotary slide valve according to the invention.

Rotary slide 02 has a protrusion 18 on an axial outer surface 19. Protrusion 18 serves as an end stop of rotary slide 02 in valve housing 03 in cooperation with drive journal 07, which is also disposed on said axial outer surface 19. For this purpose, complementary protrusions can be provided in valve housing 03, in particular in housing lid 06, which form the end stops of rotary slide valve 01 together with protrusion 18. Protrusion 18 can be particularly advantageously employed in the reworking of the rotary slide, in particular when grinding outer surface 08 of rotary slide 02, together with the configuration of drive journal 07 illustrated in FIG. 2 and axial inner recess 20 of rotary slide 02, which is illustrated in FIG. 1.

Figure 3:
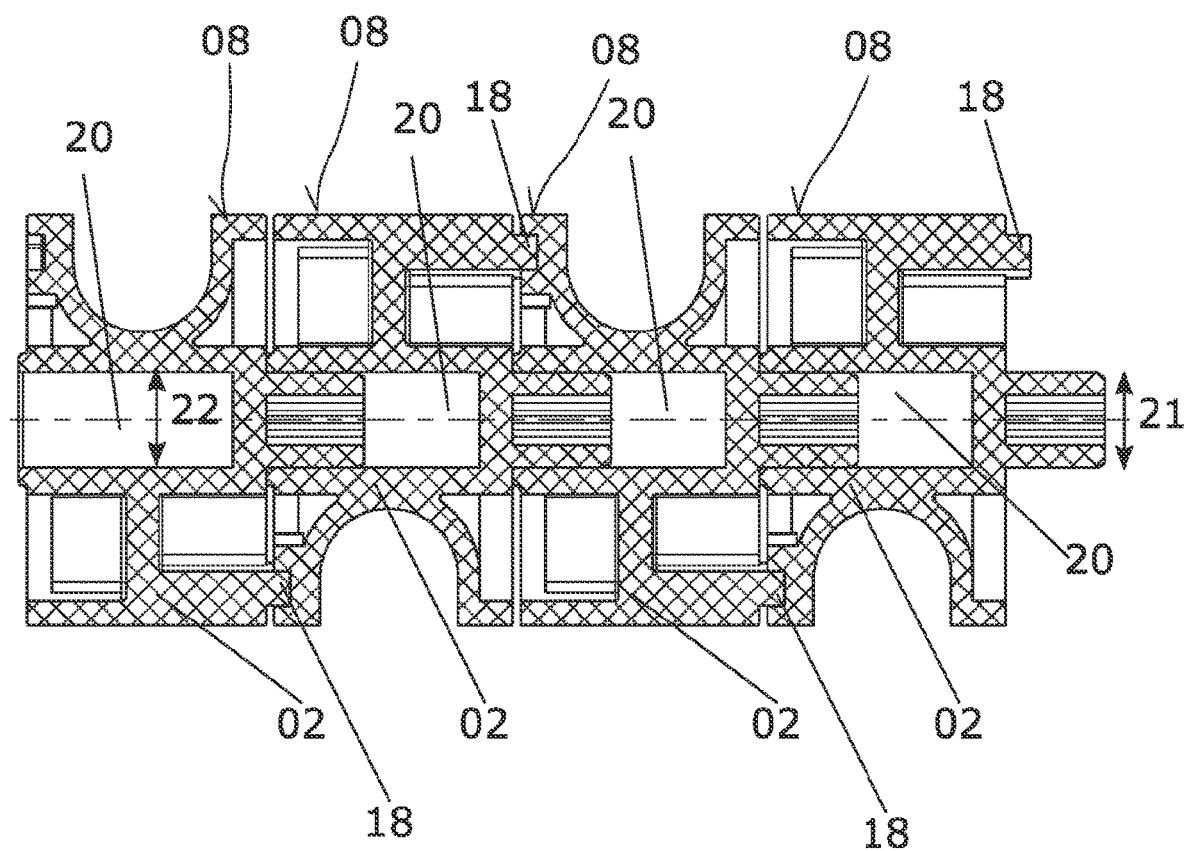
FIG. 3: is an illustration of a plurality of rotary slides in a joined state during one or more steps of the method according to the invention.

After all, as schematically illustrated in FIG. 3, the formation of drive journal 07, whose outer diameter 21 is selected to be slightly smaller than inner diameter 22 of inner recess 20 of rotary slide 02, allows multiple rotary slides 02 to be plugged into each other or placed in a row one behind the other in the axial direction, protrusions 18 of the respective rotary slide, which are not illustrated in FIG. 3, serving as a protection against twisting, and rotary slides 02 disposed one behind the other as illustrated in FIG. 3 to undergo centerless through-feed grinding of outer surfaces 08, the preferably centerless grinding of outer surfaces 08, which takes place in through-feed mode, preferably being carried out in a cascaded manner with advantageously increasing precision and advantageously increasingly finer abrasives.

This means that the grinding process is carried out in such a cascaded manner that multiple rotary slides 02 are partially plugged into one another in an axial direction and form a rotary slide group 11, the radial surface of rotary slide group 81 being essentially formed by surfaces 08 to be machined or ground. This makes a particularly effective grinding process possible, which additionally yields constantly good machining or grinding results across a plurality of rotary slides to a very high degree. To this end, the rotary slides can have complementary or partially complementary projections 07 or protrusions 18 and associated or mating recesses 20, 23, which allow rotary slides 02 to be partially plugged into one another while preferably simultaneously enabling a rotation lock or a protection against twisting of rotary slide group 11 and thus facilitating the grinding of rotary slide group 11.

Following the grinding of outer surfaces 08 of rotary slide 02, a deburring process, in particular a blast deburring process, can also be carried out. Thus, the outer surface, in particular radial outer surface 08, of the rotary slide can be produced accordingly precisely and with accordingly low tolerances so as to realize the necessarily low gap width of gap 14 overall or in combination with the reworked valve housing, in particular barrel portion 04 of valve housing 03, and thus achieve a sealing of rotary slide valve 01 without additional sealing means, such as elastomer seals, at least in barrel portion 04 of the valve housing.

REFERENCE SIGNS 01 rotary slide valve
02 rotary slide
03 valve housing
04 circumferential or barrel portion
05 housing bottom
06 housing lid
07 drive journal
08 outer surface
09 fluid openings
10 recesses
11
12 sealing means/seal
13 inner surface of the barrel portion
14 gap
15 edges of the fluid openings
16 reaming entry/axial end
17 reaming exit/axial end
18 protrusion
19 axial outer surface
20 axial inner recess
21 outer diameter of the drive journal
22 inner diameter of the inner recess
23 recess
R axis of rotation

The invention claimed is:

1. A method for producing a rotary slide valve for controlling a fluid flow, the rotary slide valve comprising a rotary slide (02) which is mounted in a valve housing in such a manner that it can rotate about an axis of rotation (R), the method comprising the following steps:

producing the rotary slide (02) in an injection molding process, a metal casting process or a metal sintering process;

producing at least a circumferential or barrel portion (04) of the valve housing (03) in an injection molding process, metal casting process or a metal sintering process;

assembling the rotary slide (02) and the valve housing (03);

wherein a gap is formed in the radial direction between the rotary slide (02) and the immediately adjacent circumferential or barrel portion (04) of the valve housing (03), the gap allowing the rotary slide (02) to rotate about the axis of rotation (R) and enabling a sealing which does not exceed a tolerable leakage between the rotary slide (02) and the circumferential or barrel portion (04) of the valve housing (03), wherein the rotary slide (02) is reworked to obtain defined outer diameters in relation to the axis of rotation (R), wherein the reworking of the rotary slide (02) comprises a grinding process for adjusting a radial outer diameter and wherein the grinding process is carried out in such a cascaded manner that multiple rotary slides (02) are partially plugged into one another in an axial direction and form a rotary slide group (11), the radial surface (81) of the rotary slide group (11) being essentially formed by the surfaces (08) to be machined or ground.

2. The method according to claim 1, wherein the circumferential or barrel portion (04) of the valve housing (03) is reworked to obtain defined outer and/or inner diameters in relation to the axis of rotation (R) and wherein the rotary slide (02) is immediately adjacent to the circumferential or barrel portion (04) of the valve housing (03) in the radial direction in an assembled state.

3. The method according to claim 1, wherein the rotary slide (02) and/or the circumferential or barrel portion (04) of the valve housing (03) are produced as glass-fiber-reinforced plastics with a glass-fiber content of 30% to 50%.

4. The method according to claim 1, wherein the rotary slide (02) and/or the circumferential or barrel portion (04) of the valve housing (03) are produced using a polyphenylene sulfide plastic (PPS).

5. The method according to claim 1, wherein the grinding process is carried out using an abrasive based on silicon carbide.

6. The method according to claim 1, further comprising a production of housing lids (06) and/or housing bottoms (05) which complete and/or close the valve housing (03) in the axial direction and which are made of a same material as the circumferential or barrel portion (04).

7. The method according to claim 1, wherein the injection molding process is a plastic injection molding process.

* * * * *